United States Patent
Fjare et al.

(10) Patent No.: US 8,822,745 B2
(45) Date of Patent: Sep. 2, 2014

(54) PYROLYSIS OIL UPGRADING TO GASOLINE RANGE LIQUIDS

(75) Inventors: Kristi A. Fjare, Bartlesville, OK (US);
Tie-Pan Shi, Bartlesville, OK (US);
Edward L. Sughrue, II, Bartlesville, OK (US); Jianhua Yao, Bartlesville, OK (US)

(73) Assignee: Phillips 66 Company, Houston, TX (US)

( * ) Notice: Subject to any disclaimer, the term of this patent is extended or adjusted under 35 U.S.C. 154(b) by 413 days.

(21) Appl. No.: 13/311,905

(22) Filed: Dec. 6, 2011

(65) Prior Publication Data

US 2013/0144089 A1     Jun. 6, 2013

(51) Int. Cl.
*C10G 65/02*     (2006.01)
*C10G 3/00*     (2006.01)

(52) U.S. Cl.
CPC ........ *C10G 65/02* (2013.01); *C10G 2300/1018* (2013.01); *Y02E 50/10* (2013.01); *C10G 3/54* (2013.01); *C10G 2300/1081* (2013.01); *C10G 2300/1014* (2013.01); *C10L 2290/544* (2013.01); *C10G 2300/1011* (2013.01); *Y02E 50/13* (2013.01); *C10G 3/49* (2013.01); *C10G 2400/04* (2013.01)
USPC ............. 585/240; 585/242; 44/605; 422/187; 422/631

(58) Field of Classification Search
CPC .... C10G 3/49; C10G 3/54; C10G 2300/1011; C10G 2300/1014; C10G 2300/1018; C10G 2300/1081; C10G 2400/04; C10L 5/42; C10L 8/00; C10L 2290/544; Y02E 50/10; Y02E 50/13

USPC ............ 585/240–242; 44/605, 606, 639; 422/187, 631, 639, 644

See application file for complete search history.

(56) References Cited

U.S. PATENT DOCUMENTS

| | | | |
|---|---|---|---|
| 4,503,278 A * | 3/1985 | Chen et al. ............ | 585/469 |
| 6,953,873 B2 * | 10/2005 | Cortright et al. ........ | 585/733 |
| 7,578,927 B2 * | 8/2009 | Marker et al. .......... | 208/67 |
| 7,767,867 B2 * | 8/2010 | Cortright ............... | 568/861 |
| 8,075,642 B2 * | 12/2011 | Dumesic et al. ........ | 44/308 |
| 8,183,422 B2 * | 5/2012 | Alegria et al. .......... | 585/240 |
| 8,329,969 B2 * | 12/2012 | McCall et al. .......... | 585/240 |
| 8,471,079 B2 * | 6/2013 | Brandvold et al. ...... | 585/240 |
| 8,492,600 B2 * | 7/2013 | Marker et al. .......... | 585/240 |
| 8,629,310 B2 * | 1/2014 | Lotero et al. ........... | 585/327 |
| 2007/0142633 A1 | 6/2007 | Yao et al. | |
| 2011/0046423 A1 * | 2/2011 | Sughrue et al. ......... | 585/240 |
| 2011/0152513 A1 | 6/2011 | Yao et al. | |
| 2011/0184215 A1 | 7/2011 | Jess et al. | |

(Continued)

OTHER PUBLICATIONS

Corma, et al., "Processing biomass-derived oxygenates in the oil refinery: Catalytic cracking (FCC) reaction pathways and role of catalyst," J. Catalysis 247:307-27 (2007).

(Continued)

*Primary Examiner* — Nina Bhat
*Assistant Examiner* — Jonathan Miller
(74) *Attorney, Agent, or Firm* — Phillips 66 Company

(57) ABSTRACT

Described is a method for converting biomass derived pyrolysis oil (bio-oil) into materials that will be more useful for transportation fuels including the following two steps: 1) solubilizing and extracting bio-oil oxygenates, and 2) zeolite catalyzed hydrogenation of the oxygenates into renewable fuel range materials.

21 Claims, 1 Drawing Sheet

(56) References Cited

U.S. PATENT DOCUMENTS

| | | | |
|---|---|---|---|
| 2011/0263916 A1* | 10/2011 | Bao et al. .................... 585/254 |
| 2012/0323051 A1* | 12/2012 | Powell ......................... 568/913 |
| 2013/0144098 A1* | 6/2013 | Pansare et al. ............... 585/310 |
| 2013/0338412 A1* | 12/2013 | Marker et al. ............... 585/240 |

OTHER PUBLICATIONS

Peterson, et al.: Thermochemical biofuel production in hydrothermal media: A review of sub- and supercritical water technologies. Energy Environ. Sci., 1:32-65 (2008).

* cited by examiner

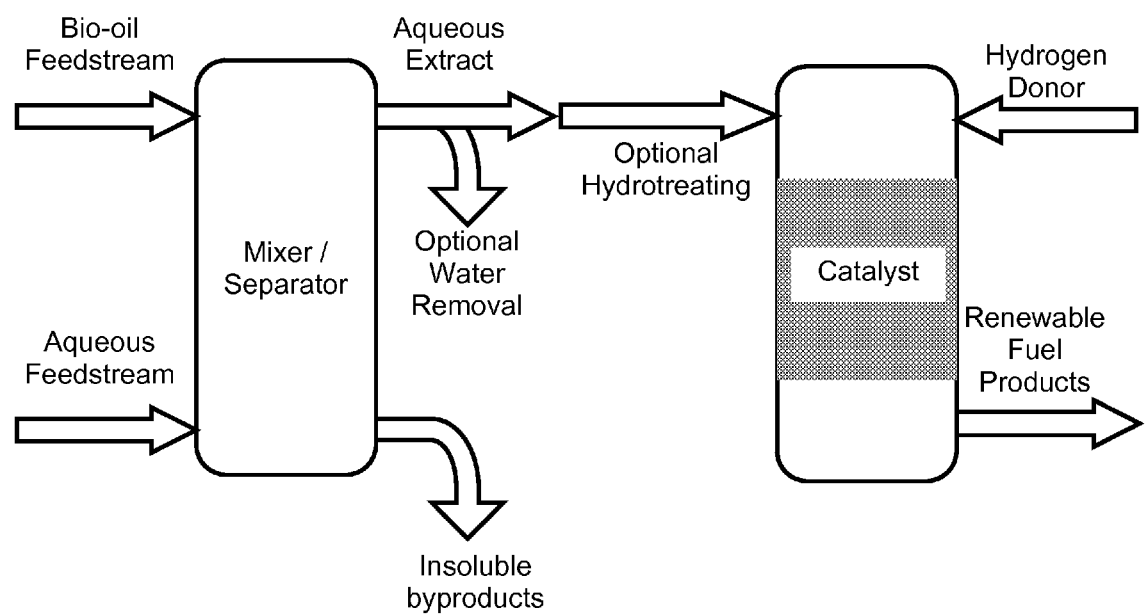

PYROLYSIS OIL UPGRADING TO GASOLINE RANGE LIQUIDS

CROSS REFERENCE TO RELATED APPLICATIONS

None.

STATEMENT OF FEDERALLY SPONSORED RESEARCH

None.

FIELD OF THE DISCLOSURE

The present invention relates generally to the conversion of pyrolysis oil and pyrolysis oil derivatives to fuel range hydrocarbons.

BACKGROUND OF THE DISCLOSURE

Processes to convert renewable resources into transportation fuels usually involve several steps. For example, one approach is to use acids to convert carbohydrates, starches, lignins, and other biomass into sugars such as glucose, lactose, fructose, sucrose, dextrose. Another approach is to convert biomass solids and liquids into pyrolysis oil.

Pyrolysis is the chemical decomposition of organic materials by heating in the absence of oxygen or other reagents. Pyrolysis can be used to convert biomass (such as lignocellulosic biomass) into pyrolysis oil or so-called bio-oil, a liquid product made by heating biomass to high temperatures (typically 350-500° C.) under inert atmosphere with a short residence time. The pyrolysis oil liquid contains molecules derived from the original cellulose, hemicellulose, and lignin in the biomass feedstock, and is consequently a mixture of primarily oxygenated products. Pyrolysis oil typically is thermally unstable, acidic, and not miscible with petroleum feedstocks. The components in the pyrolysis oil that were derived from the hemicellulose and cellulosic components in the biomass are composed of C5-C6 or lower carbon chain polyols and oligomers thereof.

Cortright, et al., US20080300435, uses processes and reactor systems for the conversion of oxygenated hydrocarbons to hydrocarbons, ketones and alcohols useful as liquid fuels, such as gasoline, jet fuel or diesel fuel and industrial chemicals. Cortright, et al., U.S. Pat. No. 6,953,873, describes a method of producing hydrocarbons from oxygenated hydrocarbon reactants, such as glycerol, glucose, or sorbitol. Marker, et al., US20080053870, uses a process for the conversion of biomass to a liquid fuel including the production of diesel and naphtha boiling point range fuels by hydrocracking of pyrolysis lignin extracted from biomass. Corma, et al., (2007) studied the catalytic cracking of glycerol and sorbitol, as representative of biomass-derived oxygenates, at 500-700° C. with six different catalysts, including a fresh fluid catalytic cracking (FCC) catalyst (FCCl), an equilibrium FCC catalyst with metal impurities (ECat), a mesoporous $Al_2O_3$, a USY zeolite (Y), a ZSM5-based FCC additive (ZSM5), and an inert silicon carbide (SiC).

Unfortunately, bio-oils produced from biomasses are a chemically complex mixture of compounds comprising generally a mixture of water, light volatiles, and non-volatiles. As a fuel, bio-oil has a number of negative properties such as high acidity (corrosiveness), substantial water content (usually in the range of 15% to 30%), it is not miscible with hydrocarbon fuels, variable viscosity, low heating values (about half that of a typical diesel fuel), high oxygen content and low cetane number. These negative properties are related to the oxygenated compounds contained in bio-oils that result in a 45 wt % oxygen content. Therefore, it is necessary to upgrade the raw bio-oils before they can be used as a viable renewable fuel.

Currently, there are no commercial technologies that will allow the production of fungible renewable fuels from bio-oil. Technologies need to be developed that can generate sufficient renewable fuel volumes to replace current non-renewable fuel sources. Therefore, new methods and processes for upgrading bio-oils obtained by pyrolysis of biomass or waste to thermally stable and fungible renewable fuels are required.

BRIEF DESCRIPTION OF THE DISCLOSURE

A method for converting the lower carbon chain polyols and oligomers into hydrocarbons that are more useful for transportation fuels has been developed. A two step process provides 1) conversion of the thermally unstable polyols into partially hydrogenated, more stable alcohols; and 2) zeolite cracking and recombination of the intermediate alcohols into gasoline range hydrocarbons.

In one embodiment, a system is described that converts biomass derived pyrolysis oil (bio-oil) into fuel range hydrocarbons where a bio-oil feedstream with pyrolyzed biomass and an aqueous feedstream are fed through a mixer/separator to mix the bio-oil feedstream and the aqueous feedstream then separate the aqueous extract comprising oxygenates, optionally a reactor may be used to stabilize the aqueous oxygenate extract through mild hydrogenation, hydrogenated oxygenates are fed with a hydrogen donor feedstream to a reactor to react the aqueous extract and hydrogen donor with a catalyst to generate fuel range hydrocarbons.

In another embodiment, a method of converting biomass derived pyrolysis oil (bio-oil) into fuel range hydrocarbons is described where a bio-oil feedstream with pyrolyzed biomass is mixed with an aqueous feedstream, the aqueous layer containing oxygenates is separated from the bio-oil feedstream which may be reacted with hydrogen in the presence of a catalyst to generate a stabilized aqueous extract, and reacting the aqueous extract with a hydrogen donor feedstream in the presence of a catalyst to generate fuel range hydrocarbons.

In yet another embodiment, a renewable fuel range hydrocarbon is produced from a biomass derived pyrolysis oil (bio-oil) by mixing a bio-oil feedstream containing pyrolyzed biomass and an aqueous feedstream, separating the an aqueous extract comprising oxygenates from the bio-oil feedstream, the aqueous extract may be mildly hydrogenated with hydrogen in the presence of a catalyst, and reacting the aqueous extract with a hydrogen donor feedstream in the presence of a catalyst to generate fuel range hydrocarbons.

The bio-oil may be the pyrolysis product of plant fiber, lignins, wood, wood byproducts, miscanthus, switchgrass, hemp, corn, poplar, willow, sorghum, sugarcane, tree byproducts, leaves, eucalyptus, palm, pulping liquor, paper, plant byproducts, plant oils, plant solids, grasses, agricultural byproducts, yard-waste, garbage, municipal waste, biologically derived manufacturing waste, animal byproducts, animal waste, bacterial solids, algal solids, and combinations thereof.

The aqueous feedstream may include de-ionized water, tap water, filtered water, salt water, brackish water, acidic water, basic water, pH neutral water, buffered water, waste water, heated water, chilled water, process water, and combinations thereof.

In one embodiment, the aqueous extract may be dehydrated, diluted, pH balanced, buffered, pre-treated, or a combinations thereof, prior to reacting the aqueous feedstream with a hydrogen donor.

In another embodiment, the low temperature hydrogenation catalyst may include a ruthenium on carbon, platinum on silica-alumina, and supported or unsupported nickel catalysts.

In yet another embodiment, the hydrogen donor may include a hydrocarbon selected from the group consisting of methane, ethane, propane, butane, pentane, hexane, octane, methanol, ethanol, propanol, isopropanol, and combinations thereof.

In another embodiment, the pretreating catalyst may include platinum, palladium, ruthenium, rhenium, nickel, cobalt, molybdenum, tungsten, copper, and/or zinc catalyst and combinations thereof. The pretreating or hydrotreating catalyst may contain silica, alumina, silica-alumina, carbon, ceria, titania, and/or zeolite supports. In yet another embodiment, he catalyst may include a zeolite catalyst including ZSM-5, ZSM-8, ZSM-11, ZSM-12, ZSM-35, ZSM-38 or combinations thereof. Additionally, the zeolite catalyst may be modified by zinc, phosphorous, boron, or other compositions.

A variety of renewable fuels may be produced including light gases, gasoline range hydrocarbons, diesel range hydrocarbons, light oils, vacuum oil, kerosene, jet fuel, naphthenes, paraffins, and mixtures thereof.

BRIEF DESCRIPTION OF THE DRAWINGS

A more complete understanding of the present invention and benefits thereof may be acquired by referring to the follow description taken in conjunction with the accompanying drawings in which:

FIG. 1: Bio-oil Conversion to Renewable Fuel Products.

DETAILED DESCRIPTION OF EMBODIMENTS OF THE INVENTION

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

This invention is a method for converting the lower carbon chain polyols and oligomers into materials that will be more useful for transportation fuels. Two steps are involved: 1) Conversion of the thermally unstable polyols into partially hydrogenated, more stable alcohols and 2) zeolite cracking and recombination of the intermediate alcohols into gasoline range materials.

Pyrolysis oil or bio-oil is a mixed liquid product derived from biomass heated in an inert atmosphere with a short residence time. Pyrolysis oil components will vary depending upon the contents of the original biomass. Typically pyrolysis oil contains molecules derived from the cellulose, hemicellulose, lignin and other biological molecules in the biomass feedstock, and is consequently a mixture of a variety of oxygenated products. Pyrolysis oil is thermally unstable, acidic, and is not typically miscible with petroleum feedstocks. The components in the pyrolysis oil that were derived from the hemicellulose and cellulosic components in the biomass are composed of C5-C6 or lower carbon chain polyols and oligomers thereof.

The pyrolysis oils according to the current invention may be derived from any type of biomass including agricultural residues, city waste, and aquatic biomass. Pyrolysis is the chemical decomposition of biomass by heating in the absence of oxygen or other reagents. U.S. Pat. No. 4,891,459, the contents of which are herein incorporated by reference in their entirety, describes one basic exemplary approach for the pyrolysis of biomass. Pyrolysis may be conducted at a variety of temperatures and pressures, with our without inert gases. Many different pyrolysis conditions are know in the art. Any oxygenated bio-oil feedstock my be used in the present invention.

Examples of suitable catalysts for low temperature hydrogenation include but are not limited to noble metals, such as platinum, palladium and ruthenium supported on carbon or metal oxides, and nickel, copper, cobalt, iron, molybdenum, either supported or unsupported. In one embodiment of the invention, the low temperature hydrogenation catalyst is ruthenium supported on carbon. In another embodiment, the catalyst is platinum supported on silica-alumina.

The composition of bio-oil is dependent upon the biomass used for pyrolysis and conditions, but bio-oil will typically include derivatives of lignins, cellulose, fiber, starches, sugars, proteins and other components not readily soluble during typical biomass processing, milling, pulping, municipal waste and the like. Bio-oils will include sugar and derivatives typically including one or more polyols (glycerol, sorbitol, xylitol, and the like), esters, aldehydes, isomers, polymers, and the like. Bio-oil from plant biomass may contain 20-30% water, 20-40% suspended solids and pyrolitic lignin; 5-15% hydroxyacetaldehyde; 0-10% levoglucosan; 0-10% acetic acid; 0-10% acetol; 0-5% cellobiosan; 0-5% glyoxal; 0-5% formaldehyde, 0-10% formic acid. Bio-oils may be dehydrated, may contain furfurals, furans, and the like, may contain reactive oxygenates, and a variety of other chemical compounds. Although bio-oil compositions may vary drastically, they typically contain high levels of oxygenates, acids, polyols, alcohols, aldehydes, and the like that are soluble in aqueous solutions along with tars, oils and solids that are typically not soluble in aqueous solution.

Oxygenates derived from biological materials as used herein includes carbohydrates, sugars, pentoses, hexoses, monosaccharides, dextrose, glucose, α-D-glucopyranose, β-D-glucopyranose, α-D-glucofuranose, β-D-glucofuranose, fructose, galactose, disaccharides, sucrose, lactose, maltose, fructose, cellobiose, melibiose, raffinose, glyceraldehyde, erythritol, xylitol, sorbitol, arabinitol, isosorbide, glycerol, glycerin, alcohol, methanol (MeOH), ethanol (EtOH), isopropyl alcohol (IPA), butanol (BuOH), n-butanol, t-butanol, ethers, methyl tert-butyl ether (MTBE), tertiary amyl methyl ether (TAME), tertiary hexyl methyl ether (THEME), ethyl tertiary butyl ether (ETBE), tertiary amyl ethyl ether (TAEE), diisopropyl ether (DIPE), hydroxymethyl-tetrahydrofuran or tetrahydro-2-furfuryl alcohol (THFA), methyltetrahydrofuran, 2-methyltetrahydrofuran, 3-methyltetrahydrofuran, tetrahydrofuran, diols, methanediol (H2C(OH)2), ethylene glycol, propane diols, 1,2-propanediol, 1,3-propanediol, butanediols, 1,2-butanediol, 1,3-butanediol, 1,4-butanediol, 2,3-butanediol, pentane diols, 1,2-pentanediol, 1,5-pentanediol, 1,8-octanediol, etohexadiol, p-menthane-3,8-diol, 2-methyl-2,4-pentanediol, aldehydes, propanal, butanal, 2,5-furan-diacarboxyaldehyde, carboxylates, acetic acid, oxopropanoic acid, acrylic acid, levulinic acid, succinic acid, 2,5-furan-dicarboxylic acid, aspartic acid, glucaric acid, glutamic acid, itaconic acid, acetylacrylic acid, 4-O-Me-glucuronic acid, gluconic acid, xylonic acid, esters, levulinate esters, lactones, valero lactone, α-methylene-γ-valerolactone, angelicalactones, trisaccharides, oligosaccharides, polysaccharides, starch, and the like including derivatives, dimers, trimers, and polymers.

Examples of suitable zeolites include, but are not limited to, those disclosed in Kirk-Othmer Encyclopedia of Chemical Technology, third edition, volume 15, pages 638-669 (John Wiley & Sons, New York, 1981). Generally, zeolites useful in the present invention have a constraint index (as defined in U.S. Pat. No. 4,097,367, which is incorporated herein by reference) in the range of from about 0.4 to about 12, and preferably in the range of from about 2 to about 9. In addition, the molar ration of $SiO_2$ to $Al_2O_3$ in the crystalline framework of the zeolite is at least about 5:1 and can range up to infinity. In one embodiment of the present invention, the molar ratio of $SiO_2$ to $Al_2O_3$ in the crystalline framework of the zeolite is in the range of from about 8:1 to about 200:1. In another embodiment of the present invention, $SiO_2$ to $Al_2O_3$ in the crystalline framework of the zeolite is in the range of from about 12:1 to about 100:1. Zeolites useful in the present invention include but are not limited to ZSM-5, ZSM-8, ZSM-11, ZSM-12, ZSM-35, ZSM-38 and combinations thereof. Some of these zeolites are also known as "MFI" or "Pentasil" zeolites. In one embodiment of the present invention, the zeolite is ZSM-5. Modified zeolites can also be used. Modified zeolites can include zeolites modified by metal cations, such as, for example, zinc, gallium, or nickel. Zeolites can also be modified by steam treatment and/or acid treatment. In addition, zeolites of the present invention may be combined with a clay, promoter, and/or a binder. Zeolites useful in the present invention may also contain an inorganic binder (also referred to as matrix material) selected from the group consisting of alumina, silica, alumina-silica, aluminum phosphate, clays (such as bentonite), and combinations thereof. The type of zeolite used will cause the final product to vary considerably.

Cellulose and hemicellulose are two major constituents in the biomass and can be broken down to C6 and C5 sugars, polyols, and derivatives using a pyrolysis process. The sugars and their derivatives can be upgraded to gasoline range hydrocarbons, mainly aromatics, using a ZSM catalyst, hydrotreating or combinations of ZSM and hydrotreating. However, the sugars and sugar derivatives with a lower hydrogen to carbon ratio are easily converted to coke and frequently lower liquid yield, foul expensive refining catalysts and other equipment. Addition of hydrogen donors with a higher—hydrogen to carbon ratio such as methanol (U.S. Pat. No. 4,503,278) and i-pentane (U.S. Pat. No. 7,678,950) have been used to decrease coking, incorporated by reference. U.S. Pat. No. 6,090,990 describes an improved catalyst containing a mixture of zeolite and a binder treated with boron trichloride which when used in the conversion of hydrocarbons to ethylene, propylene and BTX (benzene, toluene, xylene and ethylbenzene) aromatics.

Continued work and improvement of processes to convert biomass into a renewable fuel range hydrocarbon has taken many different approaches. Yao, et al., U.S. Pat. No. 7,550, 634, describes hydrotreating triglycerides to fuel range hydrocarbons. Yao, et al., US20070142633, utilize ion-exchange resins to provide a process for increasing the solubility of a carbohydrate. In US 2011046423, Sughrue, et al., hydrotreat a mixture of sorbitol and diesel over a commercial hydrotreating catalyst to produce lighter alkanes and hexanes desirable for gasoline fuels. Additionally, in US 2010099933, Yao, et al., convert carbohydrates to gasoline boiling range hydrocarbons by converting a carbohydrate-containing material to a hydrogenated carbohydrate material over a bi-functional catalyst and then convert the hydrogenated carbohydrate material to gasoline boiling range hydrocarbons over a zeolite catalyst. In U.S. Ser. No. 12/912,164, Yao, et al., use a zinc-platinum or cobalt-molybdenum impregnated zeolite catalyst (ZnPt-zeolite or CoMo-zeolite) with a carbohydrate or polyol to produce polyols and hydrocarbons. Additionally, the application entitled, "Carbohydrates Upgrading And Hydrotreating To Hydrocarbons," U.S. Ser. No. 61/328,450 filed Apr. 27, 2010, by Bao, et al., increases hydrogenated hydrocarbon concentration during polyol upgrading by hydrogenating hydrocarbon products and co-feeding a recycle stream with the incoming polyol feedstocks. Hydrogenation catalysts have also been developed, see for example, "$MoS_2$ Catalyst For The Conversion Of Sugar Alcohol To Hydrocarbons," U.S. Ser. No. 61/444,004 by Anand, et al. These patents and applications referenced above are specifically incorporated by reference in their entirety.

The following examples of certain embodiments of the invention are given. Each example is provided by way of explanation of the invention, one of many embodiments of the invention, and the following examples should not be read to limit, or define, the scope of the invention.

EXAMPLE 1

Reaction of Pyrolysis Extract

The pyrolysis oil is first treated with water to extract the water soluble cellulosic and hemicellulosic-derived compounds and enable separation from the pyrolytic lignin components. The water extract containing the cellulosic and hemicellulosic-derived compounds may be subjected directly to the mild hydrotreating conditions or the water may be removed prior to mild hydrotreatment. The purpose of the mild hydrotreating step is to stabilize the cellulosic and hemicellulosic-derived compounds to a degree that the zeolite-catalyzed reaction step can proceed without a high level of coking Reducing coking increases the amount of gasoline range products produced and increases catalyst life. Reduced coking also means that residency times, temperature or both may be increased to promote product formation.

A number of catalysts were used for this hydrotreating step, with a metal component or multiple metal components consisting of platinum, cobalt, nickel, molybdenum, ruthenium, copper and zinc supported on either silica, alumina, silica-alumina, or carbon. Semi-quantitative comparison from $^{13}$C-NMR test of the samples before and after the reaction showed changes in the chemical species in the aqueous pyrolysis oil. The amount of aldehydes, ketones, acids, esters, carbonates, substituted aromatics, aromatics, olefinics, deoxygenates and oxygenates decreased after the hydrotreating. The aliphatic carbon ($CH$, $CH_2$, $CH_3$) increased after the hydrotreatment.

TABLE 1

Reaction summary for mildly hydrotreating water-soluble fraction of pyrolysis oil at 150° C. with hydrogen at 1200 psig.

| Test # | Functional groups Catalyst | Aldehyde & Ketone | Acid & Ester | Carbonate Type | Substituted Aromatics | Aromatics/ Olefinics | Dioxygenates | Oxygenates | Aliphatic CH, CH$_2$, CH$_3$ |
|---|---|---|---|---|---|---|---|---|---|
| | | | | | C mol % conversion | | | | C mol % increase |
| 1 | 4% Pt/SiO$_2$—Al$_2$O$_3$ | 100% | 63% | NA | 0% | 100% | NA | 55% | 45% |
| 2 | 4% Pt/C | 100% | 33% | NA | 0% | 76% | NA | 43% | 41% |
| 3 | CoMo A | 100% | 0% | 100% | 100% | 0% | 100% | 11% | 9% |
| 4 | CoMo A | 100% | 40% | 100% | 100% | 0% | 100% | 24% | 0% |
| 5 | CoMo/C | 100% | 23% | 100% | 100% | 100% | 100% | 52% | 38% |
| 6 | CoMo/C | 100% | 4% | 100% | 100% | 100% | 100% | 54% | 4% |
| 7 | CoMo/C | NA | 6% | NA | 100% | 88% | NA | 41% | 36% |
| 8 | CoMo/C | NA | 33% | NA | 0% | 0% | NA | 7% | 0% |
| 9 | 5% Ru/C | 100% | 100% | NA | 100% | 53% | NA | 0% | 0% |
| 10 | 5% Ru/Al | 100% | 41% | NA | 100% | 90% | NA | 14% | 0% |
| 11 | 4% Ru/SiO$_2$—Al$_2$O$_3$ | 100% | 70% | 100% | 100% | 100% | 100% | 42% | 0% |
| 12 | 5% Ru/C | 100% | 36% | 100% | 100% | NA | 98% | 19% | 20% |
| 13 | 5% Ru/C | 100% | 1% | 100% | 100% | NA | 95% | 0% | 35% |
| 14 | 5% Ru/C | 100% | 24% | 100% | 100% | NA | 98% | 2% | 37% |
| 15 | 5% Ru/C | 100% | 82% | 100% | 100% | NA | 94% | 36% | 0% |
| 16 | ZSM5 | 35% | 0% | 100% | 100% | 0% | 100% | 46% | 0% |
| 17 | CuO—ZnO—Al$_2$O$_3$ | 100% | 44% | 100% | 100% | 100% | 90% | 4% | 0% |
| 18 | NiMo KF848 | 100% | 17% | 0% | 100% | 100% | 100% | 47% | 0% |

EXAMPLE 2

Hydrotreated Pyrolysis Extract with Methanol Over Zeolites

The pyrolysis oil is first treated with water to extract the cellulosic and hemicellulosic-derived compounds and enable separation from the pyrolytic lignin components. The water extract containing the cellulosic and hemicellulosic-derived compounds may be subjected directly to the mild hydrotreating conditions or the water may be removed prior to mild hydrotreatment. The purpose of the mild hydrotreating step is to stabilize the cellulosic and hemicellulosic-derived compounds to a degree that the zeolite-catalyzed reaction step can proceed without a high level of coking Reducing coking increasing the amount of gasoline range products produced and increases catalyst life. Reduced coking also means that residence times, temperature or both may be increased to promote product formation.

Subsequent zeolite treatment produces aromatic or olefinic products dependent upon the catalyst and operating conditions selected. Zeolite treatment may be performed directly on the mild hydrotreated product, or a step may added to remove residual water, depending on the reaction conditions desired during the zeolite treatment step.

TABLE 2

Reaction summary for mildly hydrotreated water-soluble fraction of pyrolysis oil with methanol as hydrogen donor at 450° C. and 200 psig using nitrogen as diluent.

| Catalyst | ZSM5 | ZSM5 | Zn-ZSM5 | P-ZSM5 |
|---|---|---|---|---|
| Feed ratio of Methanol/ Oxygenates | 5.1 | 1.3 | 1.4 | 2.3 |
| WHSV (h$^{-1}$) | 1.7 | 1.0 | 1.3 | 2.1 |
| Methanol Conversion % | 98.2 | 97.8 | 99.6 | 98.9 |
| Yield (C mol %) | | | | |
| C$_1$-C$_4$ | 5.0 | 7.9 | 8.7 | 7.4 |
| C$_5$+ | 63 | 60 | 60 | 58 |
| CO + CO$_2$ | 7 | 1 | 15 | 2 |
| CokeCOKE | 5 | 10 | 8 | 8 |

Gasoline and diesel range—products were generated in the presence of methanol. Methanol is a good hydrogen donor because it is miscible with aqueous solutions, it is readily available, and is relatively inexpensive. As demonstrated above, separating water soluble components from the bio-oil removes coke forming and non-soluble solids from the bio-oil. This prevents damage to the—catalyst and allows the soluble oxygenates to react with the—catalyst.

EXAMPLE 3

Reaction of Hydrotreated Pyrolysis Extract with Hexane Over Zeolites

Pyrolysis oil is treated with water as previously described to extract the cellulosic and hemicellulosic-derived compounds and enable separation from the pyrolytic lignin components. Water extract containing the cellulosic and hemicellulosic-derived compounds may be subjected directly to the mild hydrotreating conditions or the water may be removed prior to mild hydrotreatment. Subsequent zeolite treatment produces aromatic or olefinic products dependent upon the catalyst and operating conditions selected. Zeolite treatment may be performed directly on the mild hydrotreated product, or a step may added to remove residual water, depending on the reaction conditions desired during the zeolite treatment step. In this example, oxygenates and hexane are reacted over the zeolite catalyst to generate fuel range products from renewable sources.

TABLE 3

Reaction summary for mildly hydrotreated water-soluble fraction of pyrolysis oil with hexane as hydrogen donor at 450° C. and 200 psig using nitrogen as diluent.

| Catalyst | ZSM5 | Zn-ZSMS | P-ZSM5 |
|---|---|---|---|
| Feed ratio of Hexane/Oxygenates | 0.6 | 0.6 | 0.6 |
| WHSV (h$^{-1}$) | 1.6 | 1.6 | 1.6 |
| Hexane Conversion (%) | 98 | 60 | 87 |
| Yield (C mol %) | | | |
| C$_1$-C$_4$ | 11.5 | 10.4 | 12.2 |
| C$_5$+ | 67 | 58 | 51 |

TABLE 3-continued

Reaction summary for mildly hydrotreated water-soluble
fraction of pyrolysis oil with hexane as hydrogen donor
at 450° C. and 200 psig using nitrogen as diluent.

| Catalyst | ZSM5 | Zn-ZSMS | P-ZSM5 |
|---|---|---|---|
| $CO + CO_2$ | 4 | 3 | 3 |
| COKE | 10 | 14 | 9 |

After reaction, product separation is conducted via distillation. Distillation allows the recycling of the hydrocarbon solvent, used for some embodiment, and provides a clean biofuel product made of hydrocarbons fungible with conventional transportation fuels. Light hydrocarbon products, as formed from residual alcohol and low molecular weight compounds can be sent to a reformer for hydrogen production. Hydrogen produced this way is recycled to the hydrotreating step.

The ability to convert difficult plant materials like lignins, cellulose, hemicellulose, fibers, waste products and raw biomass into renewable fuels provides a direct source for renewable fuels including gasoline, diesel, oils and other products fungible with fuel products produced from non-renewable crude oils. Progress toward the catalytic hydrogenation of bio-oil to fuel range hydrocarbons has been hampered by variability of the bio-oil dependent upon materials used, corrosiveness of the bio-oil, coking of the catalyst, and short catalyst life. Extracting soluble oxygenates from the bio-oil for hydrogenation provides a robust method to generate fuel range renewable fuels that are fungible with current non-renewable, crude-oil fuel products.

In closing, it should be noted that the discussion of any reference is not an admission that it is prior art to the present invention, especially any reference that may have a publication date after the priority date of this application. At the same time, each and every claim below is hereby incorporated into this detailed description or specification as a additional embodiments of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

REFERENCES

All of the references cited herein are expressly incorporated by reference. The discussion of any reference is not an admission that it is prior art to the present invention, especially any reference that may have a publication data after the priority date of this application. Incorporated references are listed again here for convenience:
1. U.S. Pat. No. 4,503,278, U.S. Pat. No. 4,549,031, Chen, et al., "Process for converting carbohydrates to hydrocarbons," Mobil Oil Corp. (1984).
2. U.S. Pat. No. 6,953,873, US2003220531, WO2004039918, Cortright and Dumesic, "Low-temperature hydrocarbon production from oxygenated hydrocarbons," Wisconsin Alumni Res. Found., (2002).
3. U.S. Pat. No. 7,767,867, US20080300435, US2008025903, US2008216391, US2008300434, US2008300435, US2010280275, US2010288975, WO2008069830, WO2008109877, WO2008140617, Cortright, "Methods and systems for generating polyols" Virent Energy Systems, Inc (2006).
4. U.S. Pat. No. 7,578,927, US20080053870, WO2008027699, Marker, et al., "Gasoline And Diesel Production From Pyrolytic Lignin Produced From Pyrolysis Of Cellulosic Waste," UOP L.L.C. (2006).
5. US20070142633, US2010099933, WO2007075370, WO2011041081, Yao, et al., "Integrated Process For Converting Carbohydrates To Hydrocarbons," ConocoPhillips Company (2005).
6. US2011046423, WO2011025632, Sughrue, et al., "Hydrotreating Carbohydrates," ConocoPhillips Company (2009).
7. U.S. Ser. No. 12/912,164, PCT/US10/54104, Yao, et al., "Conversion Of Carbohydrates To Hydrocarbons," ConocoPhillips Company (2009).
8. U.S. Ser. No. 13/014,490, PCT/US2011/22592, "Biomass Pyrolysis In Refinery Feedstock," ConocoPhillips Company (
9. U.S. Ser. No. 61/406,210, Lotero Alegria, et al., "Hydrocarbons From Pyrolysis Oil," ConocoPhillips Company (2010).
10. U.S. Ser. No. 61/407,994, Gong, et al., "Process For Producing High Quality Pyrolysis Oil From Biomass," ConocoPhillips Company (2010).
11. U.S. Ser. No. 61/411,531, Gong, et al., "Heat Integrated Process For Producing High Quality Pyrolysis Oil From Biomass," ConocoPhillips Company (2010).
12. U.S. Ser. No. 61/427,270, Gong, et al., "Integrated Fcc Biomass Pyrolysis/Upgrading," ConocoPhillips Company (2010).
13. U.S. Ser. No. 61/428,601, Platon, et al., "Absorption And Quench Method For Biomass Pyrolysis Product," ConocoPhillips Company (2010).
14. Corma, et al., "Processing biomass-derived oxygenates in the oil refinery: Catalytic cracking (FCC) reaction pathways and role of catalyst," J. Catalysis 247:307-27 (2007).
15. Peterson, et. al.: Thermochemical biofuel production in hydrothermal media: A review of sub- and supercritical water technologies." Energy Environ. Sci., 1:32-65 (2008).

The invention claimed is:
1. A method to convert biomass derived pyrolysis oil into fuel range hydrocarbons comprising:
    a) providing a bio-oil feedstream comprising pyrolyzed biomass,
    b) mixing the bio-oil feedstream with an aqueous feedstream,
    c) separating an aqueous extract comprising oxygenates from the bio-oil feedstream and aqueous feedstream mixture,
    d) reacting the aqueous extract with hydrogen in the presence of a catalyst to generate a stabilized aqueous extract, and
    e) reacting the aqueous extract with a hydrogen donor feedstream in the presence of a zeolite catalyst to generate a renewable fuel comprising hydrocarbons.
2. The method of claim 1, wherein said pyrolysis oil is selected from the group consisting of a pyrolysis product of plant fiber, lignins, wood, wood byproducts, miscanthus, switchgrass, hemp, corn, poplar, willow, sorghum, sugarcane, tree byproducts, leaves, eucalyptus, palm, pulping liquor, paper, plant byproducts, plant oils, plant solids, grasses, agricultural byproducts, yard-waste, garbage, municipal waste, biologically derived manufacturing waste, animal byproducts, animal waste, bacterial solids, algal solids and combinations thereof.

3. The method of claim 1, wherein said aqueous feedstream comprises a member of the group consisting of de-ionized water, tap water, filtered water, salt water, brackish water, acidic water, basic water, pH neutral water, buffered water, waste water, heated water, chilled water, process water and combinations thereof.

4. The method of claim 1, wherein said aqueous extract is modified in a manner comprising at least one of dehydrated, diluted, pH balanced, buffered, pre-treated and combinations thereof, prior to reacting the stabilized aqueous feedstream with the hydrogen donor.

5. The method of claim 1, wherein the hydrogenation catalyst is selected from the group consisting of ruthenium on carbon, platinum on silica-alumina, and supported or unsupported nickel.

6. The method of claim 1, wherein said hydrogen donor comprises a hydrocarbon selected from the group consisting of methane, ethane, propane, butane, pentane, hexane, octane, methanol, ethanol, propanol, isopropanol and combinations thereof.

7. The method of claim 1, wherein said hydrogenation catalyst comprises a metal selected from platinum, palladium, ruthenium, rhenium, nickel, cobalt, molybdenum, tungsten, copper, zinc, and combinations thereof.

8. The method of claim 1, wherein said hydrogenation catalyst comprises a member of the group consisting of silica, alumina, silica-alumina, carbon, ceria, titania, zeolite and combinations thereof.

9. The method of claim 1, wherein said catalyst comprises a zeolite catalyst selected from the group consisting of ZSM-5, ZSM-8, ZSM-11, ZSM-12, ZSM-35, ZSM-38 and combinations thereof.

10. The method of claim 1, wherein said zeolite catalyst is modified by a member of the group consisting of zinc, phosphorous, boron and combinations thereof.

11. The method of claim 1, wherein said renewable fuel is selected from a member of the group consisting of light gases, gasoline range hydrocarbons, diesel range hydrocarbons, light oils, vacuum oil, kerosene, jet fuel, naphthenes, paraffins and mixtures thereof.

12. A system to convert biomass derived pyrolysis oil (bio-oil) into fuel range hydrocarbons comprising:
   a) a bio-oil feedstream comprising pyrolyzed biomass,
   b) an aqueous feedstream,
   c) a mixer/separator configured to receive and mix the bio-oil feedstream and the aqueous feedstream then separate an aqueous extract comprising oxygenates,
   d) a first reactor operatively connected to the mixer/separator and configured to receive the aqueous extract, the first reactor containing a hydrogenation catalyst and configured to stabilize the aqueous extract via mild hydrogenation to produce a stabilized aqueous extract,
   e) a second reactor that is operatively connected to receive the stabilized aqueous extract from the first reactor, the second reactor containing a zeolite catalyst and configured to react the stabilized aqueous extract and a hydrogen donor with the zeolite catalyst to generate a renewable fuel comprising hydrocarbons.

13. The system of claim 12, wherein said bio-oil comprises a member of the group consisting of the pyrolysis product of plant fiber, lignins, wood, wood byproducts, miscanthus, switchgrass, hemp, corn, poplar, willow, sorghum, sugarcane, tree byproducts, leaves, eucalyptus, palm, pulping liquor, paper, plant byproducts, plant oils, plant solids, grasses, agricultural byproducts, yard-waste, garbage, municipal waste, biologically derived manufacturing waste, animal byproducts, animal waste, bacterial solids, algal solids, and combinations thereof.

14. The system of claim 12, wherein said aqueous feedstream comprises a member of the group consisting of de-ionized water, tap water, filtered water, salt water, brackish water, acidic water, basic water, pH neutral water, buffered water, waste water, heated water, chilled water, process water, and combinations thereof.

15. The system of claim 12, wherein the hydrogenation catalyst comprises a member of the group consisting of ruthenium on carbon, platinum on silica-alumina, and supported or unsupported nickel.

16. The system of claim 12, wherein said hydrogen donor comprises a hydrocarbon selected from the group consisting of methane, ethane, propane, butane, pentane, hexane, octane, methanol, ethanol, propanol, isopropanol, and combinations thereof.

17. The system of claim 12, wherein said hydrogenation catalyst comprises a metal selected from the group consisting of platinum, palladium, ruthenium, rhenium, nickel, cobalt, molybdenum, tungsten, copper, zinc and combinations thereof.

18. The system of claim 12, wherein said hydrotreating catalyst comprises a support selected from the group consisting of silica, alumina, silica-alumina, carbon, ceria, titania, zeolite and combinations thereof.

19. The system of claim 12, wherein said zeolite catalyst comprises a member selected from the group consisting of ZSM-5, ZSM-8, ZSM-11, ZSM-12, ZSM-35, ZSM-38 and combinations thereof.

20. The system of claim 12, wherein said zeolite catalyst is modified by a member selected from the list consisting of zinc, phosphorous, boron and combinations thereof.

21. The system of claim 12, wherein said renewable fuel comprises a member selected from the group consisting of light gases, gasoline range hydrocarbons, diesel range hydrocarbons, light oils, vacuum oil, kerosene, jet fuel, naphthenes, paraffins, and mixtures thereof.

* * * * *